(12) United States Patent
Park et al.

(10) Patent No.: US 8,112,609 B2
(45) Date of Patent: Feb. 7, 2012

(54) DATA MANAGEMENT APPARATUS AND METHOD

(75) Inventors: Il-Woo Park, Seoul (KR); Jang-seok Seo, Yongin-si (KR); Sung-jae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 702 days.

(21) Appl. No.: 11/837,761

(22) Filed: Aug. 13, 2007

(65) Prior Publication Data

US 2008/0172541 A1 Jul. 17, 2008

(30) Foreign Application Priority Data

Jan. 11, 2007 (KR) ........................ 10-2007-0003495

(51) Int. Cl.
*G06F 12/00* (2006.01)
(52) U.S. Cl. ............. 711/173; 711/170; 714/5; 707/822
(58) Field of Classification Search .................. 707/202, 707/822; 714/5, 15, 20; 711/170, 173
See application file for complete search history.

(56) References Cited

U.S. PATENT DOCUMENTS

| | | | | |
|---|---|---|---|---|
| 5,448,728 A | * | 9/1995 | Takano et al. ................. | 707/205 |
| 5,845,292 A | * | 12/1998 | Bohannon et al. ............. | 707/202 |
| 5,870,537 A | * | 2/1999 | Kern et al. ......................... | 714/6 |
| 6,658,593 B1 | | 12/2003 | Ko | |
| 6,970,890 B1 | * | 11/2005 | Bruce et al. .................... | 707/202 |
| 7,099,995 B2 | * | 8/2006 | Springer et al. ............... | 711/114 |
| 7,328,373 B2 | * | 2/2008 | Kawamura et al. ............. | 714/20 |
| 2002/0049883 A1 | * | 4/2002 | Schneider et al. ............. | 711/100 |
| 2003/0163594 A1 | * | 8/2003 | Aasheim et al. ............... | 709/310 |
| 2004/0122796 A1 | * | 6/2004 | Akiyama et al. ................... | 707/1 |
| 2005/0240632 A1 | * | 10/2005 | Wong et al. .................... | 707/200 |
| 2008/0046675 A1 | * | 2/2008 | Okada et al. ................... | 711/173 |
| 2008/0133863 A1 | * | 6/2008 | Boggs et al. ................... | 711/170 |

FOREIGN PATENT DOCUMENTS

KR 1999-87011 12/1999
KR 2006-31636 4/2006

OTHER PUBLICATIONS

Piernas et al., "The Design of New Journaling File Systems: The DualFS Case", Feb. 2007, pp. 267-281, vol. 56 No. 2.*

* cited by examiner

*Primary Examiner* — Matthew Bradley
(74) *Attorney, Agent, or Firm* — NSIP Law

(57) ABSTRACT

A data management apparatus and method. The data management apparatus includes an input unit to receive a request to update information included in a predetermined master BAT (block allocation table) block of a plurality of master BAT blocks; and an update unit to record updated information to the predetermined master BAT block based on the update request.

23 Claims, 4 Drawing Sheets

DATA MANAGEMENT APPARATUS AND METHOD

CROSS-REFERENCE TO RELATED APPLICATION

This application claims the benefit of Korean Patent Application No. 2007-3495, filed in the Korean Intellectual Property Office on Jan. 11, 2007, the disclosure of which is incorporated herein by reference.

BACKGROUND OF THE INVENTION

1. Field of the Invention

Aspects of the present invention relate to a data management apparatus and method and, more particularly, to a data management apparatus and method capable of safely and efficiently managing data and reducing data loss due to system problems.

2. Description of the Related Art

Multimedia products generally include a storage device having content stored therein. The storage device needs to have a way of recording content onto the storage device. The recording may fail due to a problem supplying power, an external impact, or a disk error occurring during the recording process. Therefore, DTVs (Digital Television), IPTVs (Internet Protocol Television), PVRs (Personal Video Recorder), or other multimedia products having a mass storage disk should safely store data to be recorded on the disk even when the power is suddenly cut.

FIG. 1 shows a file system according to the related art. General file systems store data management information in data blocks in order to manage stored data. The information stored in the data blocks is stored in a reservation block included in the disk so as to be stored and managed in the same position of the disk. As shown in FIG. 1, a boot sector block 10 is prepared for a bootable storage device. When power is supplied to a computer, programs to be executed to initialize a system and to load an operating system into memory are stored in the boot sector block 10.

A partition table block 20 is prepared to store information necessary to divide the mass storage disk into the size determined by the user or to divide one disk into a plurality of partitions for management. A file system information block 30 is allocated to hold file system management information and stored in a predetermined position of the disk.

A block managing information block 40 is prepared to store information on a data block 50 to be managed by the file system. The block managing information block 40 is used to manage the data blocks 50 existing on the disk. Information on the data blocks 50 is stored and managed in a predetermined storage space designated according to the file system. The data blocks 50 are storage space for storing data.

The file system may update information stored in the block managing information block 40 and then record data with respect to the data block 50 on the disk. The file system may also record data on the disk and then update information stored in the block managing information block 40.

The information on the block managing information block 40 to be recorded is stored in a predetermined/designated position of the disk. The position is determined when initializing the disk by the corresponding file system and is stored on the disk whenever information on a memory is updated. The information on the data block 50 that copies and stores the same data is stored in a designated predetermined storage space (block) and used to restore data when disk access failure occurs due to a power supply problem or other problems.

The file system accesses the disk by performing read/write operations, searches a file system loaded in a predetermined position of the memory and information stored in the block managing information block 40, and operates on data. The file system updates information stored in the disk when the block managing information stored in the memory and file system managing information are updated and predetermined conditions are satisfied according to an algorithm implemented in the file system.

However, according to the related art, since the information necessary for managing the stored data is stored only in designated blocks on the disk, the designated blocks are frequently accessed to perform the read/write operation. If the corresponding blocks are damaged due to problems of the disk, for example, failure of supplying power, the information recorded in the entire disk is in danger of being lost.

Since the disk storing the copy of the corresponding information is accessed to hold the copy as the same as the original information, the data may be lost when failing to access the disk due to the problem of power supply failures.

SUMMARY OF THE INVENTION

Aspects of the present invention provide a data managing apparatus and method capable of safely and efficiently managing data and reducing data loss due to system problems.

According to an aspect of the invention, a data management apparatus is provided. The apparatus includes an input unit to receive an update request to update information included in a predetermined master BAT (block allocation table) block of a plurality of master BAT blocks; and an update unit to record updated information to the predetermined master BAT block based on the update request.

According to another aspect of the invention, a data management method is provided. The method includes receiving an update request with respect to information included in a predetermined master BAT block among a plurality of master BAT blocks; and recording update information with respect to the information included in the master BAT block requested to be updated to a master BAT block corresponding to the master BAT block requested to be updated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
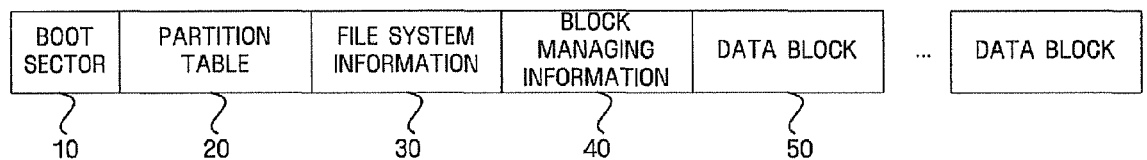
FIG. 1 is a view showing a file system according to the related art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
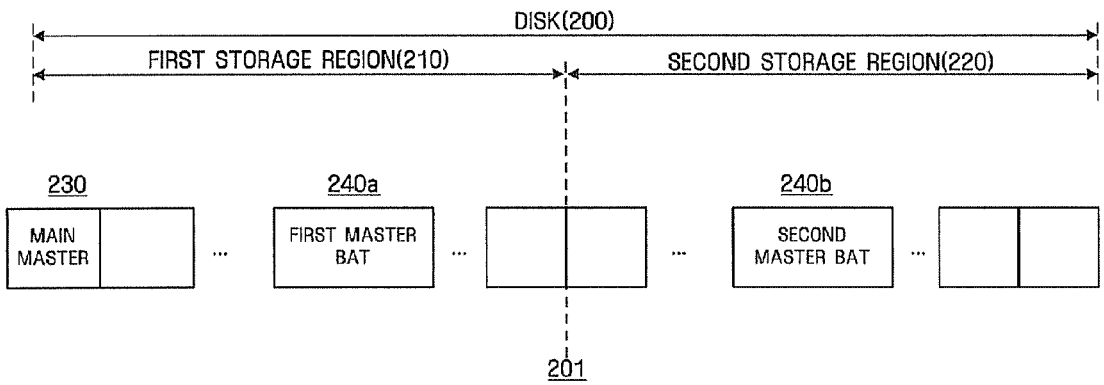
FIG. 2 is a view showing a main master block and a master BAT block according to an embodiment of the invention.

FIG. 2 is a view showing a main master block and a master BAT block according to an embodiment of the invention. A main master block 230 allocated in a disk 200 stores pointer information with respect to a plurality of master BAT (Block Allocation Table) blocks 240a and 240b. The main master block 230 may store positional information with respect to the master BAT blocks 240a and 240b on the disk 200. The disk 200 may be a standalone disk or may be part of another apparatus, such as a desktop computer, portable computer, digital phone, personal digital assistant, personal entertainment device, etc.

Any number of master BAT blocks 240a and 240b may be stored in a first storage region 210 and a second storage region 220 into which the disk 200 is physically or logically divided on the basis of a dotted line 201 of FIG. 2. Enough master BAT blocks 240a and 240b may be allocated on the entire disk 200 so as to prevent data loss. Each of the master BAT blocks 240a and 240b includes a plurality of slave BAT blocks that store management information for data blocks in which real data is stored. The main master block 230 may be located in the first storage region 210 and/or the second storage region 220; thus, only one copy of the main master block 230 may be stored on only one of the two storage regions, or multiple copies of the main master block 230 may be stored on the disk 200, one in each of the two storage regions. Although the disk 200 is described as having two storage regions, disks according to other aspects of the invention may have any number of storage regions.

Figure 3:
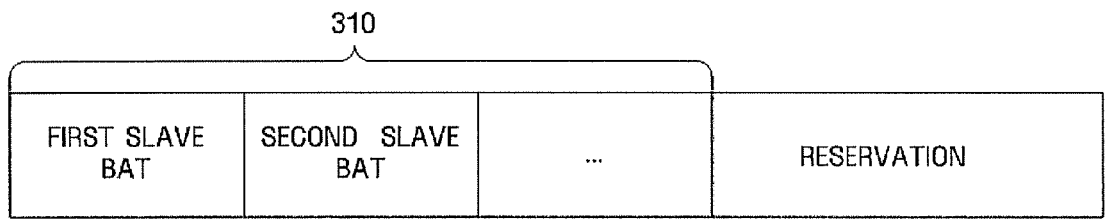
FIG. 3 is a view showing a slave BAT block included in the master BAT block according to an embodiment of the invention.

FIG. 3 is a view showing a slave BAT block included in the master BAT block according to an embodiment of the invention. As shown in FIG. 3, the first master BAT block 240a of the first storage region 210 includes a plurality of slave BAT blocks 310. Similarly, other master BAT blocks on the disk 200, including second master BAT block 240b, may also include a plurality of slave BAT blocks.

When information stored in a slave BAT block included in a predetermined master BAT block is updated, the updated information is alternately stored in each master BAT block of the first storage region 210 and the second storage region 220. For example, when information stored in a predetermined slave BAT included in the first master BAT block 240a of the first storage region 210 is updated, updated information A' corresponding to the information A stored in the predetermined slave BAT included in the first master BAT block 240a of the first storage region 210 is stored in the second master BAT block 240b of the second storage region 220.

The least accessed slave BAT block may be selected from the slave BAT blocks included in the second master BAT block 240b. The update information A' corresponding to the information A stored in the slave BAT block included in the first master BAT block 240a is stored in the least accessed slave BAT block. As a result, it is possible to prevent the predetermined slave BAT block from being excessively accessed.

In the same way, when information stored in the predetermined slave BAT included in the second master BAT block 240b is updated, the first master BAT block 240a stores the update information A" corresponding to the information A' stored in the second master BAT block 240b. The number of accesses to the same region is reduced and the data is stored in different regions on the disk as the latest updated information. Accordingly, it is possible to prevent data loss due to system problems such as a power supply failure.

Figure 4:
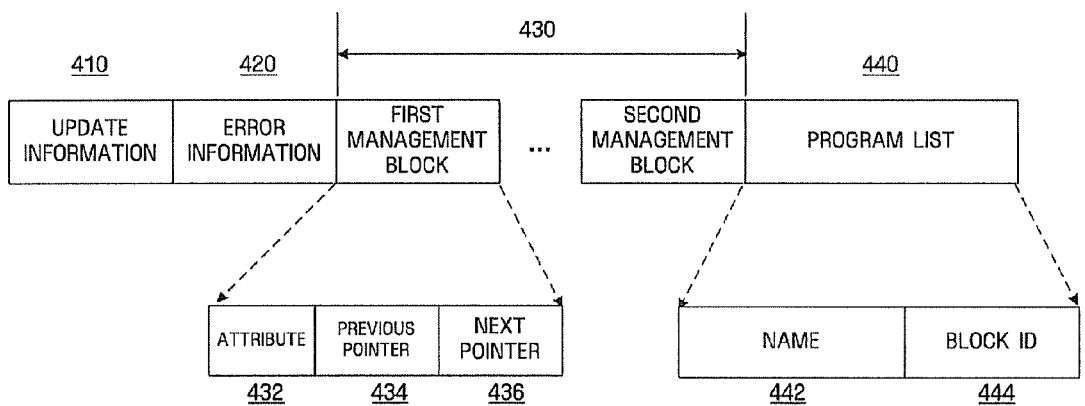
FIG. 4 is a view showing management information stored in the slave BAT block according to an embodiment of the invention.

FIG. 4 is a view showing management information stored in the slave BAT block according to an embodiment of the invention. Each of the slave BAT blocks 310 stores management information with respect to a data block allocated on the entire disk 200 to store real data. The management information includes information stored in an update information block 410, an error information block 420, a management block 430, and a program list block 440.

The update information block 410 may store information indicating the number of updates of the management information with respect to the data block. The update information block 410 may store information indicating the number of updates or the updated version of the management information whenever the management information is updated. The error information block 420 may store information on availability of data blocks. The information on the availability of a data block indicates whether a predetermined data block has an error or not.

The management block 430 includes an attribute block 432 and previous and next pointer blocks 434 and 436. The attribute block 432 may store attribute information of the data block. The previous and next pointer blocks 434 and 436 may store pointer information with respect to the previous and next data blocks. The attribute information of the data block may include information with respect to the kind of file stored in the data block. The pointer information with respect to the previous and next pointer blocks may include connection information between the data blocks. The connection information indicates position information of the data blocks on the disk 200. For example, in a case of a moving picture file, the position of a next moving picture frame to be connected to a previous moving picture frame may be indicated using the connection information.

The program list block 440 includes a name block 442 and a BID (Block ID) block 444. The name block 442 stores a file name, and the BID block 444 stores information on a start pointer of the data block in which the real data is stored. The start pointer indicates the position information of a first block of the data block in which the data is stored. The data block in which data of the corresponding file is stored is accessed using the file name and the start pointer of the program list block 440. The entire data of the corresponding file is accessed using the pointer information stored in the previous and next pointer blocks 434 and 436.

If a total recording number (or disk access number) of the slave BAT blocks included in the master BAT block exceeds a threshold number, a new master BAT is allocated in a region where the master BAT is included such that one master BAT block is not excessively accessed for the read/write operation. In this case, information stored in the slave BAT block in which the latest update information is recorded may be stored in the newly allocated master BAT block.

The information stored in the main master block 230 is recorded on the disk through an access for write operation when the disk is formatted for the first time. The information stored in the main master block 230 is updated when the total recording number of the slave BAT blocks (or disk access number) included in the master BAT block exceeds the threshold number and the new master BAT block is allocated.

If a hardware problem occurs in the slave BAT block, a slave BAT block in which the latest update information is recorded is searched and data in the slave BAT block is restored with the latest updated information stored before the problem occurred, using the information stored in the searched slave BAT block. Whether a hardware problem occurred in the slave BAT block may be determined using the information on availability of the data block stored in the error information block 420. For example, if a hardware bad sector is generated in the slave BAT block included in the first master BAT block 240a of the first storage region 210, the slave BAT block in which the latest update information is stored is searched from the first storage region 210 and the second storage region 220. A new master BAT block is allocated on the first storage region 210 where the bad sector was generated. The information stored in the searched slave BAT block is recorded in the newly allocated master BAT block.

As a result, it is possible to minimize data loss using immediately previous data of the latest updated information because the connection information with respect to only one data block is lost. The data lost corresponds to data for two minutes of multimedia in the multimedia file system.

Figure 5:
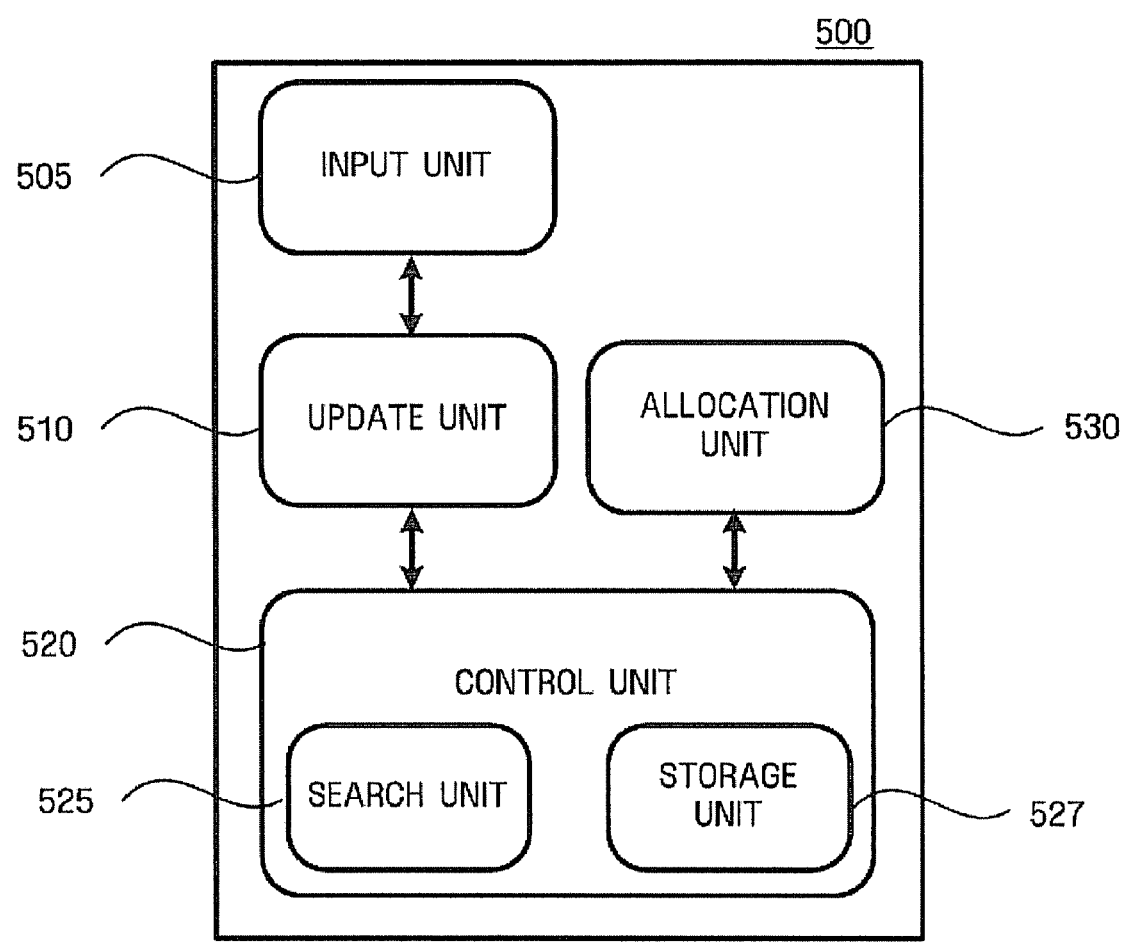
FIG. 5 is a block diagram showing a data management apparatus according to an embodiment of the invention.

FIG. 5 is a block diagram showing a data management apparatus according to an embodiment of the invention. The data management apparatus 500 includes an input unit 505, an update unit 510, a control unit 520, and an allocation unit 530.

The input unit 505 receives an update request with respect to information included in the predetermined master BAT block among the plurality of master BAT blocks. For example, when information stored in the predetermined slave BAT block included in the master BAT block is updated, a predetermined processor may input the update request to the input unit 505.

The update unit 510 records the updated information in a master BAT block corresponding to the master BAT block requested to update the information. For example, when the information stored in the slave BAT block included in the master BAT block 240a is updated, the updated information with respect to the information stored in the slave BAT block is recorded in a slave BAT block included in the master BAT block 240b. The update unit 510 alternately records the updated information in the master BAT blocks 240a, 240b of the first storage region and the second storage region whenever the information stored in the slave BAT block is updated. Other aspects of the present invention may employ a similar process when the disk contains more than two storage regions.

For example, as shown in FIGS. 2 and 3, when the information stored in the slave BAT block included in the first master BAT block 240a is updated, the update unit 510 records the updated information with respect to the information stored in the slave BAT block included in the first master BAT block 240a to the second master BAT block 240b. The update unit 510 records the updated information in the least accessed slave BAT block among the slave BAT blocks included in the second master BAT block 240b.

The control unit 520 includes a search unit 525 and a storage unit 527. The control unit 520 causes the update unit 510 to record the updated information in the master BAT block of the plurality of storage regions (first storage region and second storage region), alternately, whenever receiving the update request. The control unit 520 may select the least accessed slave BAT block among the slave BAT blocks included in the master BAT block of the predetermined storage region and causes the update unit 510 to record the updated information. As a result, it is possible to prevent the predetermined slave BAT block from being excessively accessed.

The control unit 520 determines whether the total recording number (or disk access number) of the slave BAT blocks included in the master BAT block exceeds the threshold number and causes the allocation unit 530 (which will be described below) to allocate a new master BAT block in a region where the master BAT block is included such that one master BAT block is not excessively accessed for read/write operations. The control unit 520 may cause the storage unit 527 to store, in the newly allocated master BAT block, information stored in the slave BAT block in which the latest update information is stored. When the new master BAT block is allocated, the control unit 520 causes the update unit 510 to update information stored in the main master block 230.

When a hardware problem occurs in the slave BAT block, the control unit 520 causes the search unit 525 to search for the slave BAT block in which the latest updated information is stored. Whether the hardware problem occurs in the slave BAT block may be determined using the information on the availability of the data block stored in the error information block 420. The control unit 520 causes the allocation unit 530 to allocate a new master BAT block in the region where the hardware problem occurs and causes the storage unit 527 to store, in the newly allocated master BAT block, the information stored in the searched slave BAT block, so as to restore the information with the latest updated information before the problem occurs on the system.

When the total recording number of the slave BAT blocks (or disk access number) included in the master BAT block exceeds the threshold number, or a hardware problem occurs in the slave BAT block, the allocation unit 530 allocates a new master BAT block in a region where the master BAT block is included. For example, as shown in FIGS. 2 and 3, if a hardware bad sector is generated in the slave BAT block included in the first master BAT block 240a, the allocation unit 530 allocates a new master BAT block in the first storage region 210 where the bad sector was generated.

Figure 6:
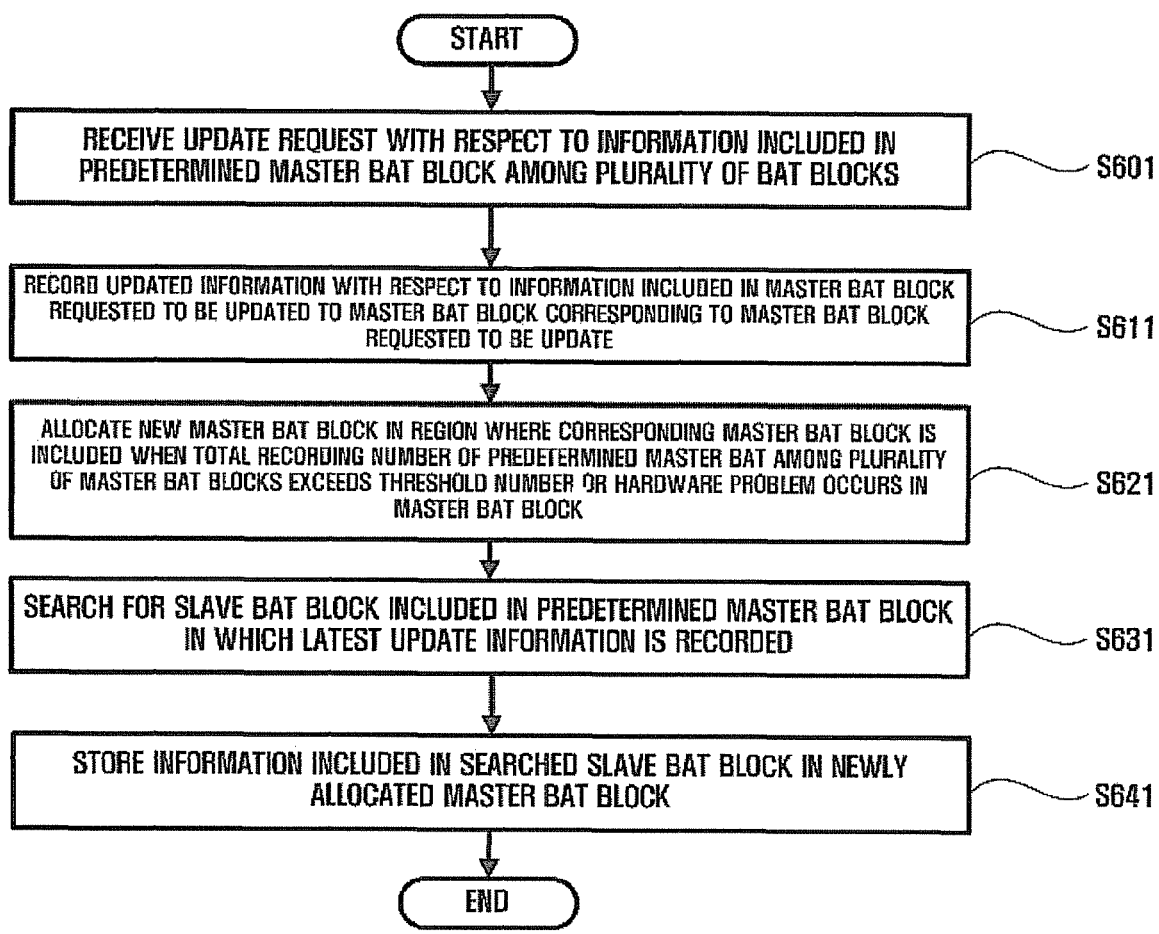
FIG. 6 is a flowchart showing a data management method according to an embodiment of the invention.

FIG. 6 is a flowchart showing a data management method according to an embodiment of the invention. The input unit 505 receives an update request with respect to information included in a predetermined master BAT block among the plurality of BAT blocks in operation S601. In operation S611, the update unit 510 records updated information with respect to the information included in the master BAT block requested to be updated to a master BAT block corresponding to the master BAT block requested to be updated.

If the total recording number of a predetermined master BAT block among the plurality of master BAT blocks exceeds the threshold number, or the hardware problem occurs in the master BAT block, then in operation S621 the allocation unit 530 allocates a new master BAT block in a storage region where the corresponding master block is included. The search unit 525 searches a slave BAT block included in the predetermined master BAT block in which the latest update information is recorded in operation S631. The storage unit 527 stores the information included in the searched slave BAT block in the newly allocated master BAT block in operation S641.

Disk management techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the above-described data management apparatus and method according to aspects of the present invention, it is possible to safely and efficiently manage data and reduce data loss due to system problems.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data management apparatus comprising:
an input unit to receive a request to update information included in a predetermined master BAT (block allocation table) block of a plurality of master BAT blocks; and
an update unit to record updated information to the predetermined master BAT block based on the update request;
wherein the plurality of master BAT blocks comprises a plurality of first master BAT blocks stored in a first storage region and a plurality of second master BAT blocks stored in a second storage region, wherein a disk is physically divided into the first storage region and the second storage region;
wherein the update unit alternately records the updated information in one of the plurality of the first master BAT blocks of the first storage region and one of the plurality of second master BAT blocks of the second storage region;
wherein when information stored in a predetermined slave BAT included in the first master BAT block of the first storage region is updated, the second master BAT block stores the updated information corresponding to the information stored in the first master BAT block; and
wherein when information stored in a predetermined slave BAT included in the second master BAT block of the second storage region is updated, the first master BAT block stores the updated information corresponding to the information stored in the second master BAT block.

2. The data management apparatus of claim 1, further comprising:
an allocation unit to allocate a new master BAT block in a storage region including the predetermined master BAT block when a total recording number of the predetermined master BAT block exceeds a threshold number or a hardware problem occurs in the data management apparatus.

3. The data management apparatus of claim 2, further comprising:
a search unit to search for a slave BAT block included in an updated master BAT block in which latest updated information is recorded when the total recording number of the updated master BAT block exceeds the threshold number or the hardware problem occurs.

4. The data management apparatus of claim 3, further comprising:
a storage unit to store information included in the searched slave BAT block in the new master BAT block.

5. The data management apparatus of claim 1, wherein the update unit stores the updated information in a least accessed slave BAT block of slave BAT blocks included in the predetermined master BAT block.

6. The data management apparatus of claim 5, wherein each slave BAT block stores position information of data blocks that store data.

7. The data management apparatus of claim 1, further comprising:
an allocation unit to allocate the plurality of master BAT blocks to a first storage region and a second storage region that are logically or physically separate;
wherein the plurality of master BAT blocks comprise a predetermined number of master BAT blocks.

8. The data management apparatus of claim 7, wherein the first storage region and/or the second storage region stores position information with respect to the plurality of master BAT blocks.

9. A data management method comprising:
receiving a request to update information included in a master BAT (block allocation table) block of a plurality of master BAT blocks; and
recording, by an update unit, updated information to the master BAT block requested to be updated based on the update request;
wherein the plurality of master BAT blocks comprises a plurality of first master BAT blocks stored in a first storage region and a plurality of second master BAT blocks stored in a second storage region, wherein a disk is physically divided into the first storage region and the second storage region; and
wherein the update unit alternately records the updated information in one of the plurality of first master BAT blocks of the first storage region and one of the plurality of second master BAT blocks of the second storage region,
wherein when information stored in the predetermined slave BAT included in the first master BAT block of the first storage region is updated, the second master BAT block stores the updated information corresponding to the information stored in the first master BAT block,
wherein when information stored in the predetermined slave BAT included in the second master BAT block of the second storage region is updated, the first master BAT block stores the updated information corresponding to the information stored in the second master BAT block.

10. The data management method of claim 9, further comprising:
allocating a new master BAT block in a storage region including a predetermined master BAT block when a total recording number of the predetermined master BAT block exceeds a threshold number or a hardware problem occurs.

11. The data management method of claim 10, further comprising:
storing information stored in a slave BAT block included in an updated master BAT block in which latest updated information is recorded in the new master BAT block.

12. The data management method of claim 9, wherein the recording of the update information comprises storing the update information in a least accessed slave BAT block of slave BAT blocks included in the master BAT block requested to be updated.

13. The data management method of claim 12, wherein each of the slave BAT blocks store positional information of data blocks that store data.

14. The data management method of claim 9, further comprising:
allocating the plurality of master BAT blocks are to a first storage region and a second storage region that are logically or physically separate;
wherein the plurality of master BAT blocks comprise a predetermined number of master BAT blocks.

15. The data management method of claim 14, wherein the first storage region and/or the second storage region stores position information with respect to the plurality of master BAT blocks.

16. The data management method of claim 9, further comprising:
identifying a slave BAT (block allocation table) block on a disk in which a hardware failure has occurred;
searching for a slave BAT having most recently updated information;
allocating, in a storage region of the disk where the hardware failure occurred, a new master BAT block having a plurality of slave BAT blocks; and
recording the slave BAT having the most recently updated information in the new master BAT block.

17. The method of claim 16, further comprising:
updating a main master block having information about all master BAT blocks included on the disk with information about the new master BAT block.

18. The method of claim 16, further comprising:
determining that a hardware failure has occurred based on information in an error information block in the slave BAT block.

19. A disk comprising:
a disk storage unit having a plurality of storage regions, each of the plurality of storage regions having a plurality of master BAT (block allocation table) blocks, and the plurality of storage regions are divided into a first storage region and a second storage region into which a disk is physically divided, and the plurality of master BAT blocks are divided into first master BAT blocks stored in the first storage region and second master BAT blocks stored in the second storage region; and
an update unit to update information in one of the plurality of master BAT blocks based on a request to update information included in the one of the plurality of master BAT blocks;
wherein each master BAT block includes a plurality of slave BAT blocks to store management information about data blocks in which data is stored, and the update unit updates a slave BAT block in the one of the plurality of master BAT blocks that is least accessed; and
wherein the update unit records the updated information in one of the plurality of master BAT blocks alternately between a master BAT block of the first master BAT blocks and a master BAT block of the second master BAT blocks.

20. The disk of claim 19, further comprising:
an allocation unit to allocate a new master BAT block in one of the plurality of storage regions when an amount of disk accesses of a master BAT block in the one of the plurality of storage regions exceeds a threshold number or when a hardware problem occurs in the disk storage unit.

21. The disk of claim 20, further comprising:
a search unit to search for a slave BAT block included in a predetermined master BAT block in which a latest updated information is recorded when the amount of disk accesses of the predetermined master BAT block exceeds the threshold number or when the hardware problem occurs; and
a storage unit to store the information included in the slave BAT block in the newly allocated master BAT block.

22. A method of minimizing disk accesses, the method comprising:
identifying a master BAT (batch allocation table) block on a disk corresponding to a request to update information included in the master BAT block; and
updating a slave BAT table included in the master BAT block that is least accessed, using the information in the request to update information; and
alternately updating master BAT blocks between a master BAT block of first master BAT blocks and a master BAT block of second master BAT blocks with the updated information,
wherein the disk comprises the plurality of storage regions having a plurality of master BAT blocks, and the plurality of storage regions are divided into a first storage region storing the first master BAT blocks and a second storage region storing the second master BAT blocks, wherein the disk is physically divided into the first storage region and the second storage region.

23. The method of claim 22, wherein the alternately updating of the master BAT blocks comprises updating a least accessed slave BAT block of the master BAT block being updated.

* * * * *